United States Patent
Peitzer et al.

(10) Patent No.: US 11,076,324 B2
(45) Date of Patent: Jul. 27, 2021

(54) NETWORK ASSISTED BEAM SELECTION FOR HANDOVER IN 5G OR OTHER NEXT GENERATION WIRELESS COMMUNICATION SYSTEMS

(71) Applicant: AT&T Intellectual Property I, L.P., Atlanta, GA (US)

(72) Inventors: Haywood S. Peitzer, Randolph, NJ (US); Yupeng Jia, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 68 days.

(21) Appl. No.: 16/507,741

(22) Filed: Jul. 10, 2019

(65) Prior Publication Data

US 2021/0014748 A1 Jan. 14, 2021

(51) Int. Cl.
*H04W 36/00* (2009.01)
*H04W 36/08* (2009.01)
(Continued)

(52) U.S. Cl.
CPC ....... *H04W 36/0061* (2013.01); *H04W 16/28* (2013.01); *H04W 24/10* (2013.01); *H04W 36/0072* (2013.01); *H04W 36/08* (2013.01); *H04W 36/245* (2013.01); *H04W 72/046* (2013.01)

(58) Field of Classification Search
CPC ......... H04W 36/0061; H04W 36/0072; H04W 36/245; H04W 24/10; H04W 72/046; H04W 36/08; H04W 16/28
See application file for complete search history.

(56) References Cited

U.S. PATENT DOCUMENTS

| 2014/0204902 A1* | 7/2014 | Maltsev | H04W 36/0083 370/331 |
| 2014/0302869 A1* | 10/2014 | Rosenbaum | G01S 5/14 455/456.1 |

(Continued)

OTHER PUBLICATIONS

3GPP, "3rd Generation Partnership Project; Technical Specification Group Radio Access Network; NR; Radio Resource Control (RRC); Protocol specification (Release 15)," © 2017, 3GPP Organizational Partners, 13 pages.

*Primary Examiner* — Jeffrey M Rutkowski
*Assistant Examiner* — Chae S Lee
(74) *Attorney, Agent, or Firm* — Amin, Turocy & Watson, LLP

(57) ABSTRACT

The described technology is generally directed towards having a wireless network device assist a user equipment to facilitate narrow beam handover. A network device determines narrow beam handover candidates of neighbor cell sites based on geometric relationships between the user equipment, a serving cell site and the neighbor cell site candidates. Historical information such as previous narrow beam handovers from a serving beam to neighbor narrow beams can be used to select a lesser number of the possible candidate beams. The network device sends the candidate beams to the user equipment, which then measures and reports the measurements to the network device. If handover criteria based on the measurement is met, the network device orders a handover to a selected narrow beam, e.g., the narrow beam with the best measurement data of the candidates.

20 Claims, 12 Drawing Sheets

(51) Int. Cl.
*H04W 36/24* (2009.01)
*H04W 16/28* (2009.01)
*H04W 72/04* (2009.01)
*H04W 24/10* (2009.01)

(56) References Cited

U.S. PATENT DOCUMENTS

2016/0337916 A1* 11/2016 Deenoo ............. H04W 36/0088
2020/0336184 A1* 10/2020 Sheng ................. H04B 7/0626

* cited by examiner

```
RRCReconfiguration ::=            SEQUENCE {
    rrc-TransactionIdentifier         RRC-TransactionIdentifier,
    criticalExtensions                CHOICE {
        rrcReconfiguration                RRCReconfiguration-IEs,
        criticalExtensionsFuture          SEQUENCE {}
    }
}

RRCReconfiguration-IEs ::=        SEQUENCE {
    radioBearerConfig                 RadioBearerConfig                                                   OPTIONAL, -- Need M
    secondaryCellGroup                OCTET STRING (CONTAINING CellGroupConfig)                           OPTIONAL, -- Need M
    measConfig                        MeasConfig                                                          OPTIONAL, -- Need M
    lateNonCriticalExtension          OCTET STRING                                                        OPTIONAL,
    nonCriticalExtension              RRCReconfiguration-v1530-IEs                                        OPTIONAL
}

RRCReconfiguration-v1530-IEs ::=  SEQUENCE {
    masterCellGroup                   OCTET STRING (CONTAINING CellGroupConfig)                           OPTIONAL, -- Need M
    fullConfig                        ENUMERATED {true}                                                   OPTIONAL, -- Cond FullConfig
    dedicatedNAS-MessageList          SEQUENCE (SIZE(1..maxDRB)) OF DedicatedNAS-Message                  OPTIONAL, -- Cond nonHO
    masterKeyUpdate                   MasterKeyUpdate                                                     OPTIONAL, -- Cond MasterKeyChange
    dedicatedSIB1-Delivery            OCTET STRING (CONTAINING SIB1)                                      OPTIONAL, -- Need N
    dedicatedSystemInformationDelivery OCTET STRING (CONTAINING SystemInformation)                        OPTIONAL, -- Need N
    otherConfig                       OtherConfig                                                         OPTIONAL, -- Need M
    nonCriticalExtension              RRCReconfiguration-v1540-IEs                                        OPTIONAL
}
```

⬇ *Continued from FIG. 4*

```
RRCReconfiguration-v1540-IEs ::=   SEQUENCE {
    otherConfig-v1540                  OtherConfig-v1540    OPTIONAL, -- Need M
    nonCriticalExtension               SEQUENCE {}          OPTIONAL
}

MasterKeyUpdate ::=                SEQUENCE {
    keySetChangeIndicator              BOOLEAN,
    nextHopChainingCount               NextHopChainingCount,
    nas-Container                      OCTET STRING         OPTIONAL,  -- Cond securityNASC
    ...
}
```

FIG. 5

NETWORK ASSISTED BEAM SELECTION FOR HANDOVER IN 5G OR OTHER NEXT GENERATION WIRELESS COMMUNICATION SYSTEMS

TECHNICAL FIELD

The subject application is related to wireless communication systems, and more particularly to selecting a narrow beam for handover (handoff) of a user equipment in a wireless communication system.

BACKGROUND

In wireless communication systems, including New Radio (NR, sometimes referred to as 5G) and likely beyond, a user equipment often needs to be transferred from one cell site to another cell site, which is typically referred to as handover (or handoff). In a NR standalone scenario, the radio cells are used for both control plane traffic and user plane traffic, and operate in the millimeter wave spectrum, e.g., the 39 gigahertz band.

Mobility handovers in the millimeter wave spectrum are difficult, generally due to high path loss. At present, for handover, a wide (60 degree) beam of a cell site is used first, with a narrow (3.75 degree) beam selected later. Without extra antenna gain, in order to deploy standalone millimeter wave 5G, a user equipment will lose NR between sites, unless many more sites are deployed.

BRIEF DESCRIPTION OF THE DRAWINGS

The technology described herein is illustrated by way of example and not limited in the accompanying figures in which like reference numerals indicate similar elements and in which:

FIGS. 4 and 5 comprise a representation of an example radio resource control (RRC) reconfiguration message suitable for conveying information elements for narrow beam handoffs, in accordance with various aspects and implementations of the subject disclosure.

DETAILED DESCRIPTION

Figure 1:
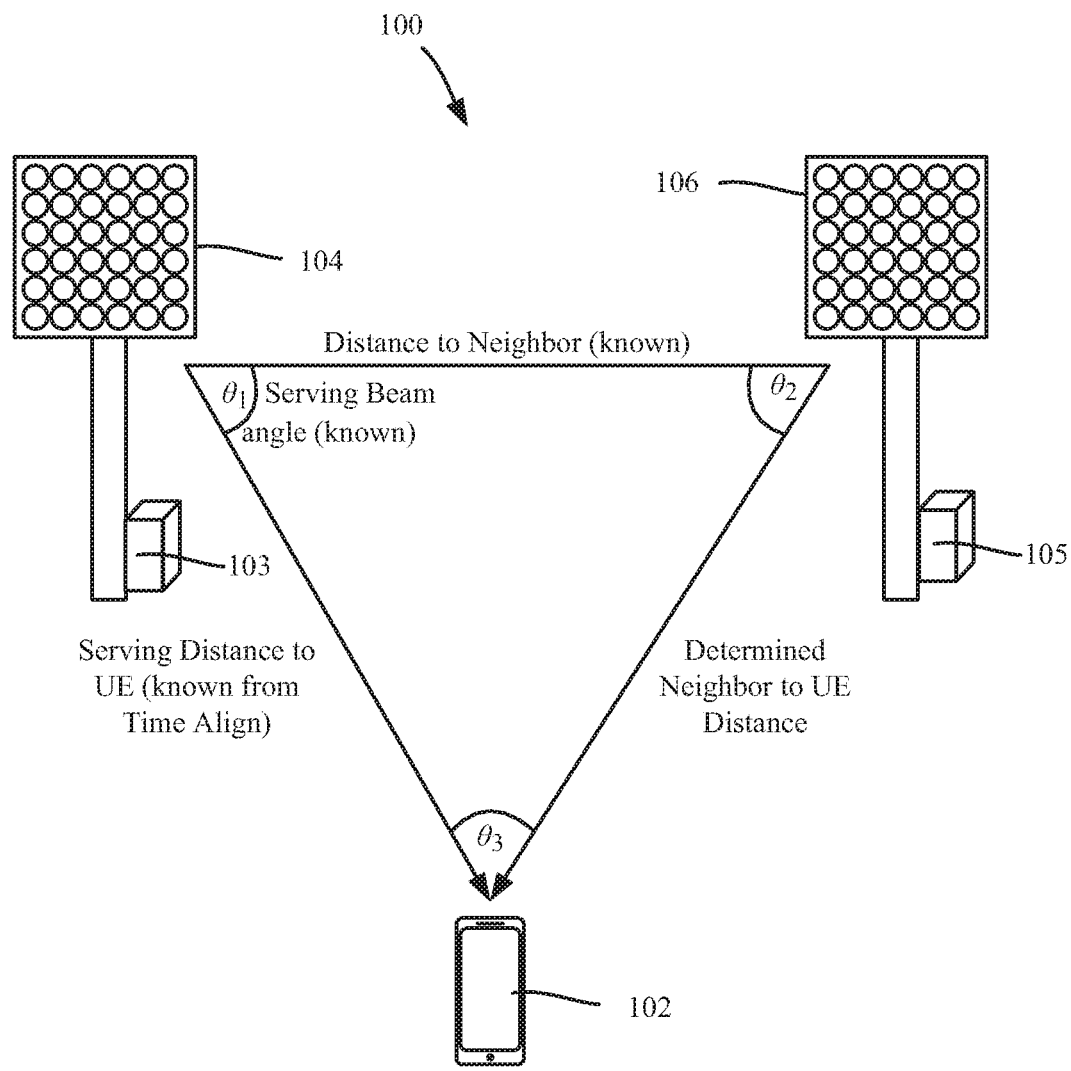
FIG. 1 illustrates an example wireless communication system in which a network device (e.g., of a serving cell site) uses the geometric relationship with a user equipment and a neighbor cell site to determine handover candidate narrow beams, in accordance with various aspects and implementations of the subject disclosure.

Briefly, one or more aspects of the technology described herein are generally directed towards network assisted narrow beam selection for mobility 5G new radio, or other next generation wireless communication systems. By having the network assist a user equipment in handover to a higher gain, narrow beam (e.g., to a 3.75 degree wide beam instead of 60 degree wide beam), +12 dB of signal gain can be achieved, improving handoff performance. Note that it is also feasible to do a wide beam to wide beam handover, and narrow beam to narrow beam handoffs, which can yield an additional +12 dB of gain.

Note that under a current 3GPP definition of beam management, a user equipment measures reference signal received power (RSRP) to determine beam tracking and steering. In one or more implementations of the technology described herein, a network device (e.g., of a cell site) sends beam measurement recommendation data in a new information element, defined in 3GPP 38.331 section 6.2.2 to the user equipment. The network device calculates the beam measurement recommendation data based on a geometric relationship between a serving cell site, a neighbor handover candidate cell site and the user equipment. The possible neighbor beam candidates further can be narrowed based on existing handover data (e.g., via machine learning operating on historical handoff data) for the narrow beam candidates. Note that the recommendation data can be applied to multiple neighbor candidate sites and their respective beams, rather than only one neighbor.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject technology. In various embodiments, the system 100 is or comprises a wireless communication network serviced by one or more wireless communication network providers. In example embodiments, a user equipment 102 can be communicatively coupled to the wireless communication network via a serving network device cell site 103 (e.g., network node) and its associated antenna array 104. As is understood, communication can be in the millimeter wave spectrum, and can include wide beam and/or narrow beam communications. Note that the technology described herein can be used in standalone 5G networks, in contrast to non-standalone 5G networks that are supported by the 4G-LTE infrastructure.

In FIG. 1, a neighbor cell site network device 105 and its associated antenna array 106 are available for possible handover of the user equipment 102. As described herein, the handover can be accomplished to a narrow beam of the neighbor cell site network device 105 based on the geometric relationship between the serving cell site network device 103, the neighbor cell site network device 105 and the user equipment 102.

More particularly, the serving distance to the user equipment is known from time alignment, e.g., L1=c*time align offset, where c is the propagation speed, basically the speed of light for wireless communications. The approximate serving beam angle $\theta_1$ is also known, based on which antenna the serving site 103 is currently using (the angle of arrival can be estimated in the network device as the incident angle of received signals from the user equipment 102). Also known is the distance (e.g., L2) from the serving site to the neighbor site. This forms a side-angle-side (SAS) triangle, which can be solved by trigonometry, e.g., using the law of cosines to find the distance to the neighbor site and the law of sines to determine the angles. Thus, a likely handover candidate beam can be determined based on $\theta_2$.

Notwithstanding, the determined handover candidate beam is only an estimate, and thus other beams such as those adjacent the determined handover candidate beam are also likely candidates. In addition to trigonometry, the network can use (e.g., via machine learning, statistical analysis, or the like) the history of handoff beams for each serving beam. In other words, each possible serving beam has its own set of neighbor beams, and because each serving beam is narrow, neighbor measurements can be minimized.

The network recommends such narrow beam candidates to the user equipment, e.g., in an information element sent in a radio resource control (RRC) reconfiguration message (e.g., FIGS. 4 and 5), and the user equipment 102 can measure the beams (note that wide beam is used if no data is provided). As with other RRC measurements, the user equipment 102 measures the beams and reports the results to the network device (e.g., gNodeB). If and when handover criteria is met, e.g., a candidate beam is deemed sufficiently better than the current serving beam, the network device 103 orders the handover.

The system 100 can further include one or more communication service provider networks that facilitate providing wireless communication services to various UEs, including the UE 102 and others (not explicitly shown), via the network devices 103 and/or 105 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.).

The network devices 103 and 105 can be connected to the one or more communication service provider networks (e.g., the core network) via one or more backhaul links. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., a UE 102 and the network device 103). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UE 102 and the network devices 103 and 105) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

Note that a DMRS structure for four antenna ports (hence maximum four layers and 4 DMRS) in NR system, for example, has reference symbols within a resource-block transmitted for a single antenna port 0; the same reference symbols are code multiplexed and transmitted on antenna port 1. Similarly for ports 2 and 3 same resource elements are used for transmitting DMRS (demodulation reference symbols), and are code multiplexed as in port 0 and 1. Further note that the resource elements used for rank 3 and rank 4 (ports 2 and 3) are orthogonal in frequency to that of port 0 and 1.

FIG. 1 thus shows how handover to a narrow beam based on trigonometry and historical information can be accomplished. It is understood, however, that the example of FIG. 1 describes only one neighbor cell site, and that the above technology can be used with multiple neighbor cell sites as shown in FIG. 2.

Figure 2:
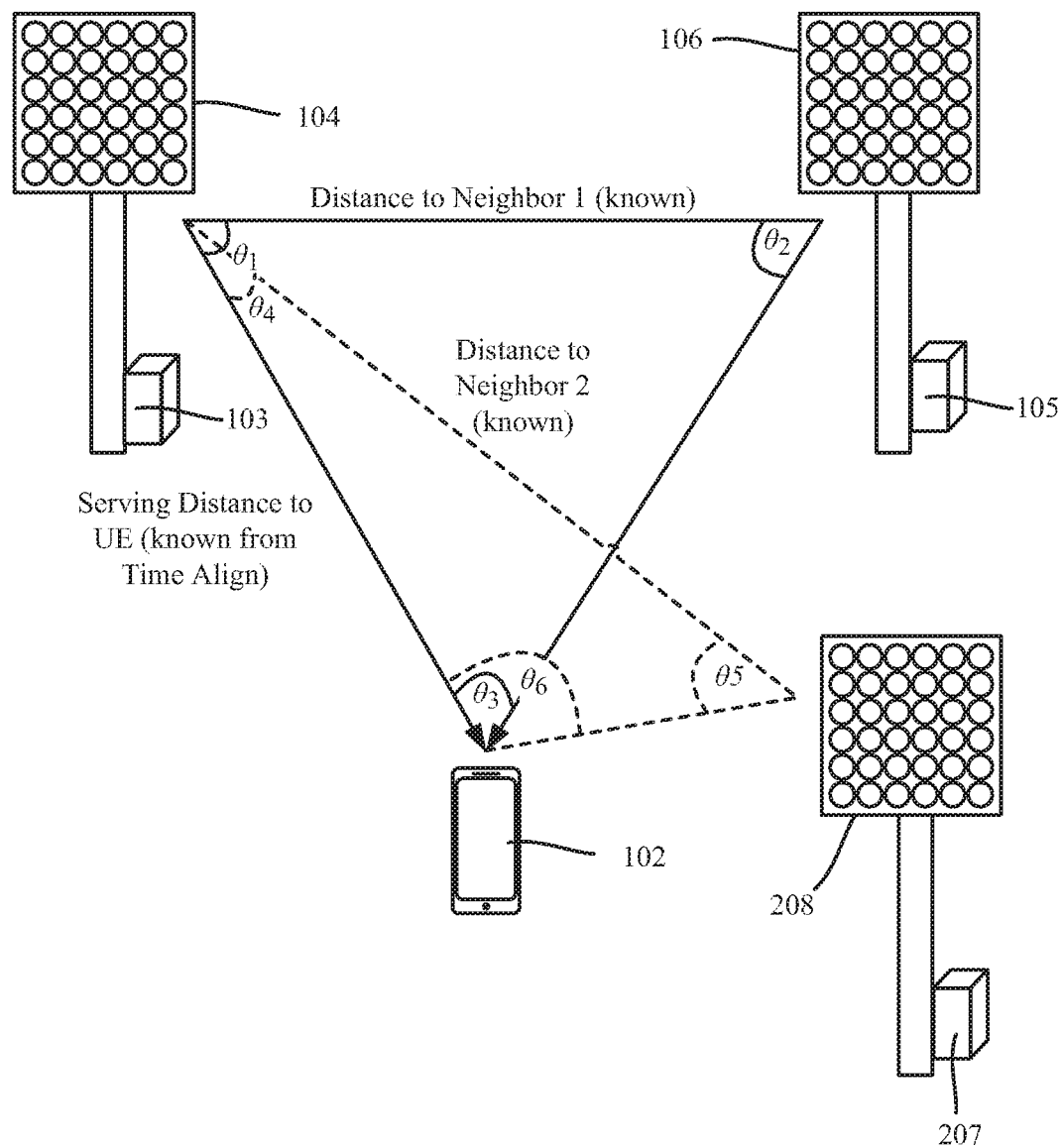
FIG. 2 illustrates an example wireless communication system in which a network device (e.g., of a serving cell site) uses the geometric relationships with a user equipment and multiple (two are shown) neighbor cell sites to determine handover candidate narrow beams, in accordance with various aspects and implementations of the subject disclosure.

More particularly, FIG. 2 shows another neighbor cell site network device 207 with associated antenna array 208. Again, the same determination can be made for this SAS triangle, using the serving distance, the known angle $\theta_4$ and the distance to the other neighbor cell site network device 207 to determine the handover candidate beams for the other site's antenna array 208.

Figure 3:
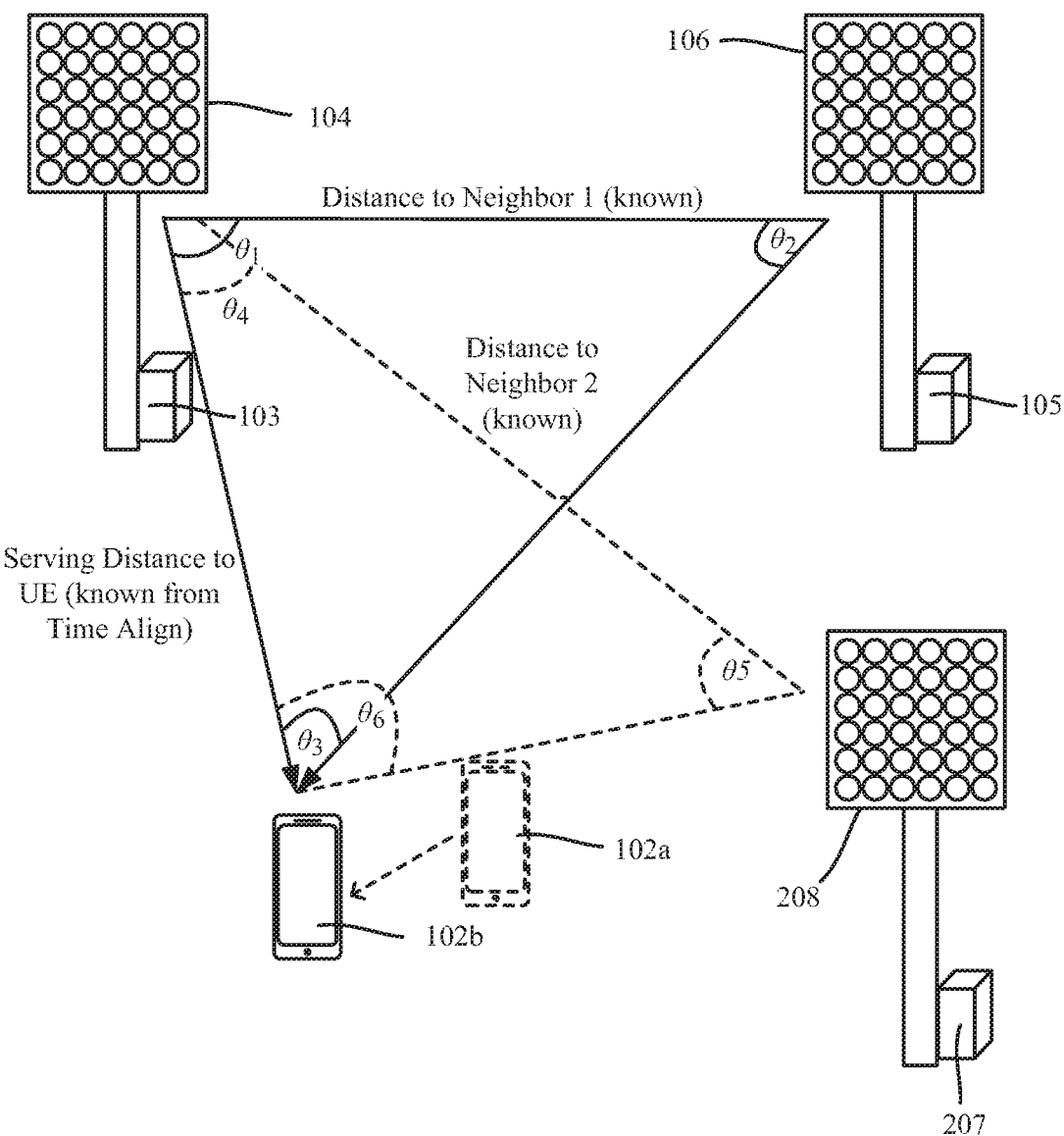
FIG. 3 illustrates an example wireless communication system in which a network device (e.g., of a serving cell site) uses the geometric relationships with a user equipment that has moved to determine handover candidate narrow beams, in accordance with various aspects and implementations of the subject disclosure.

FIG. 3 shows a similar example, except that the user equipment 102 has moved from its former position 102a to a new position 102b, possibly causing the network to order handover (if, for example, the previous position did not result in handover). As can be seen, the values of the various angles and the various distances change, but the trigonometry-based determinations used to select candidate beams still apply. With these determinations, historical data can be used to narrow the total number of candidate beams to a practical set.

A radio resource control (RRC) reconfiguration message that is suitable for communicating information elements for narrow beam handoffs as described herein is shown in FIGS. 4 and 5. As is understood, this is only one example message, and other ways to communicate such information can be implemented.

Figure 6:
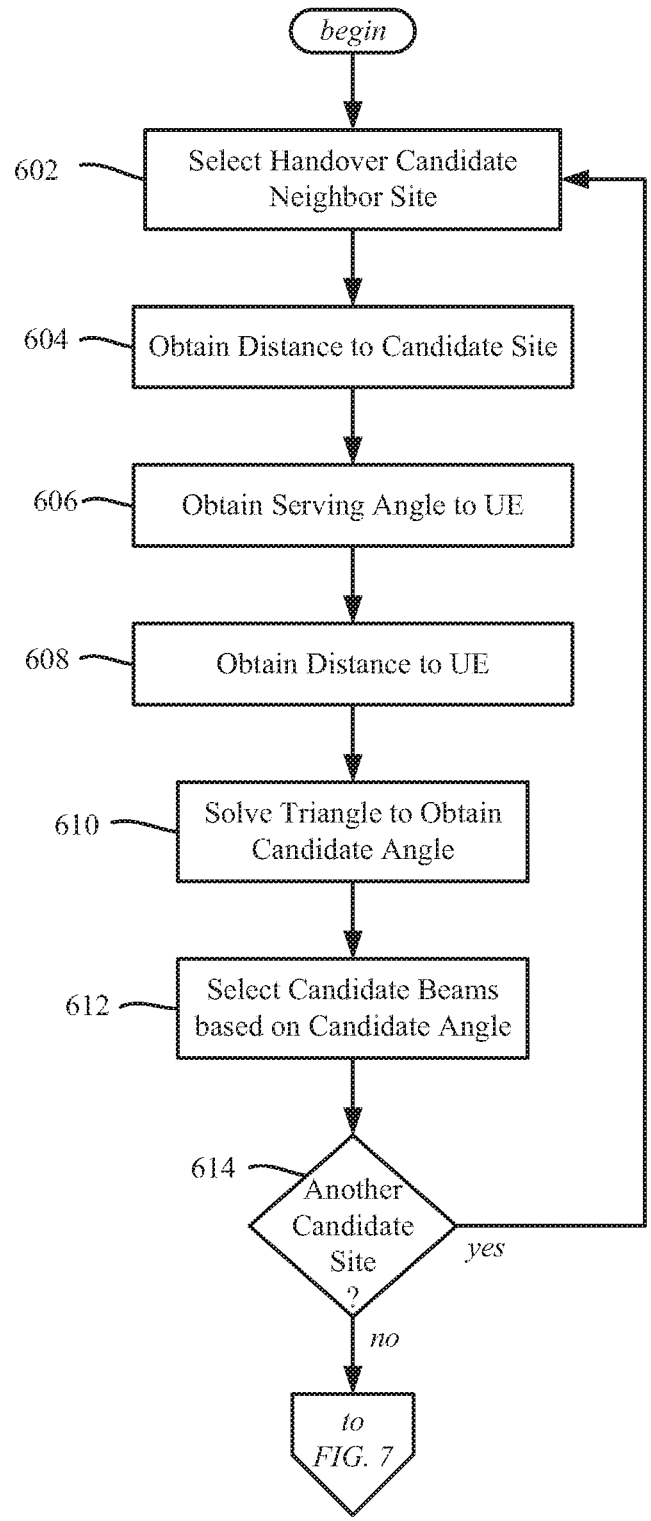
FIGS. 6 and 7 comprise a flow diagram of example operations of a network device to assist a user equipment by recommending narrow beam handover candidates for the user equipment to measure, for possible handover, in accordance with various aspects and implementations of the subject disclosure.
Figure 7:
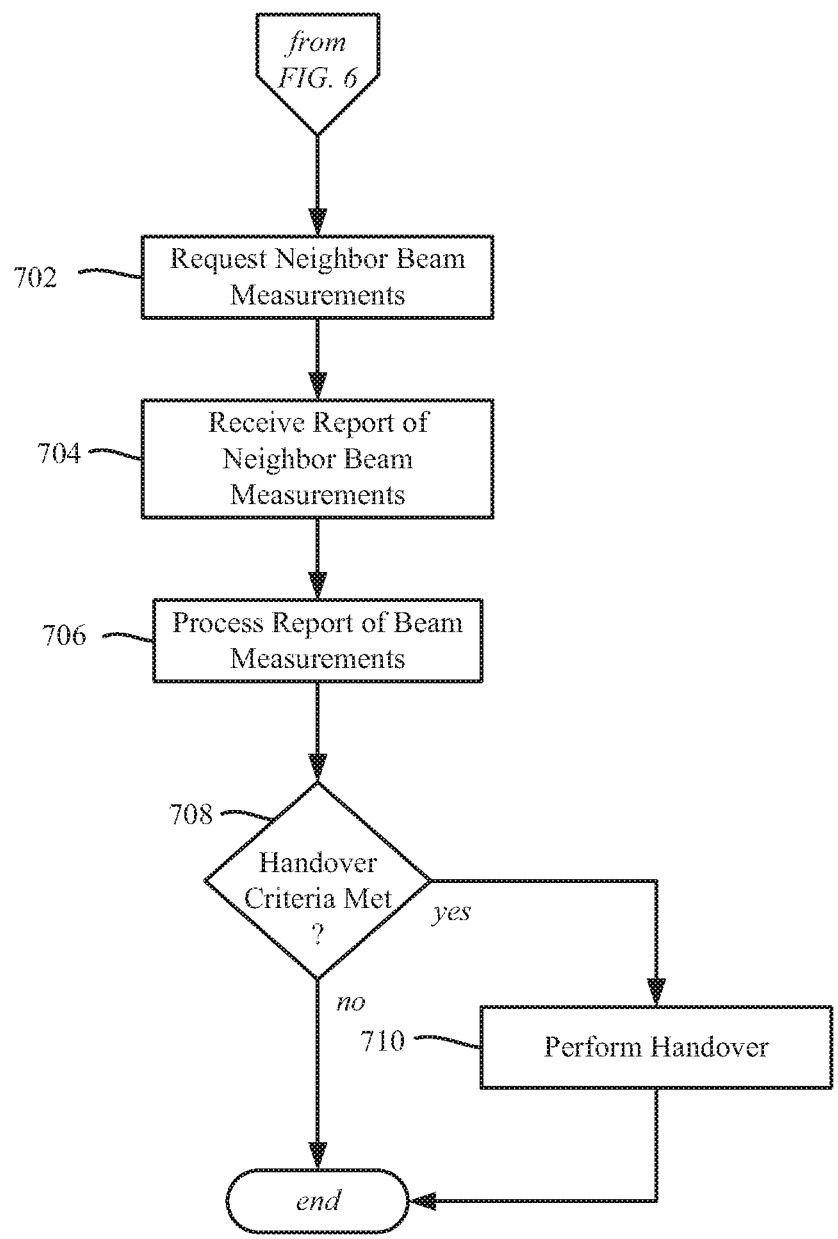

FIGS. 6 and 7 summarize example operations of the network device in assisting the user equipment in measuring candidate narrow beams. Operation 602 of FIG. 6 represents selecting a candidate neighbor site for possible handover, and operation 604 represents obtaining (e.g., looking up in a data store) the distance to the neighbor site.

Operation 606 represents determining the serving angle as described herein, and operation 608 computes the distance to the user equipment (if not already computed for other purposes). With the side-angle-side data, operation 610 represents solving the triangle to determine the angle to the candidate. Based on the angle to the candidate site, candidate beams are selected as represented by operation 612, e.g., adjacent beams as well as beams to which handovers previously occurred based on historical data.

Operation 614 represents repeating the procedure for other candidate sites. Note that at least some of these operations can be performed in parallel or substantially in parallel, rather than selecting the neighbor sites one at a time.

The procedure continues to operation 702 of FIG. 7, where the network sends the selected beam information to the user equipment, requesting measurement of the beams. In response to the measurement request, the network receives the reported beam measurements at operation 704, and at operation 706 processes the beam measurements versus handover criteria. If (e.g., the highest power) beam meets the handover criteria as evaluated at operation 708, the network orders the handover at operation 710 to that beam. If not, the serving beam continues to serve the user equipment.

Figure 8:
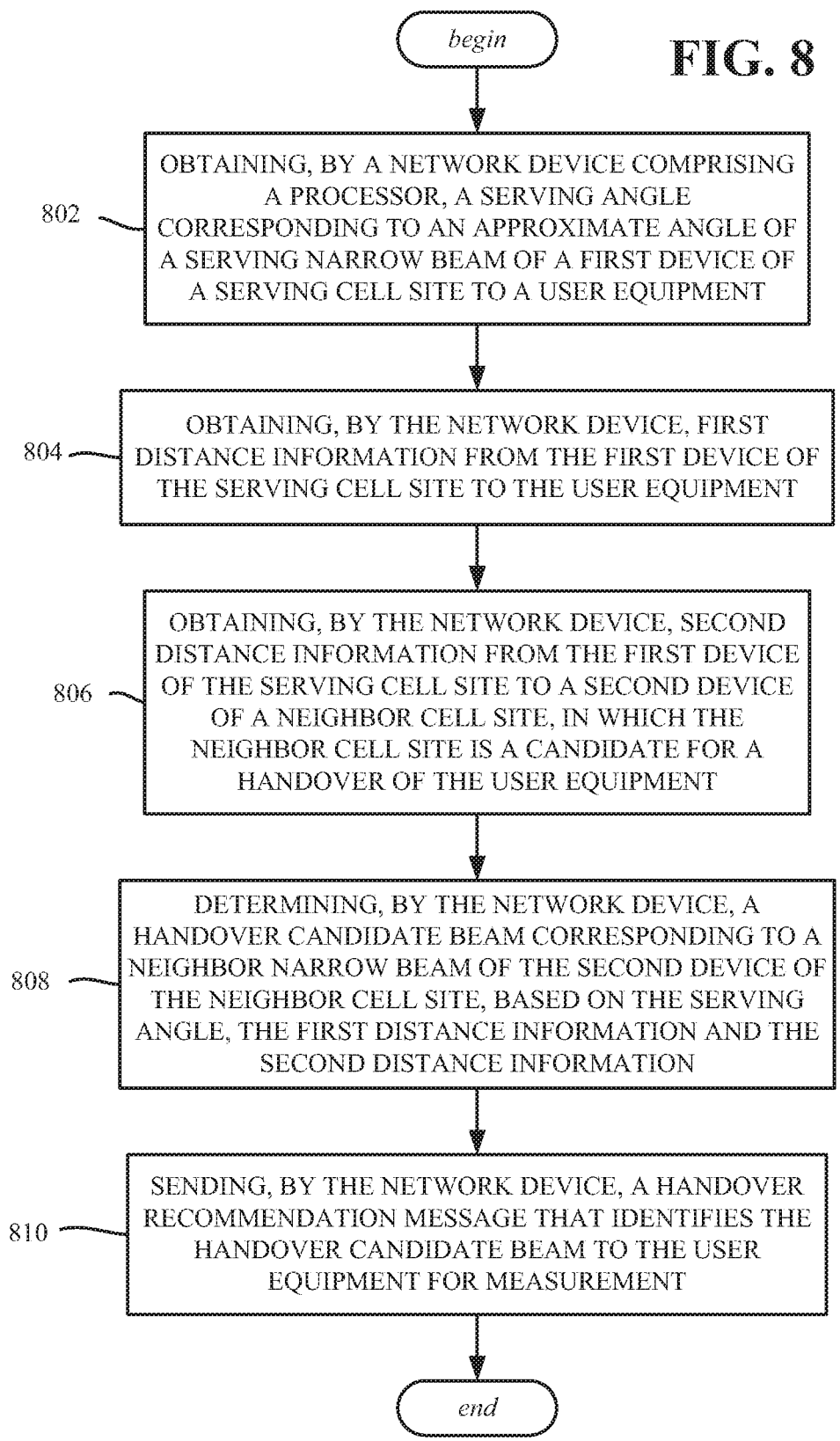
FIG. 8 illustrates a flow diagram of example operations of a network device to recommend at least one narrow beam handover candidate to a user equipment, in accordance with various aspects and implementations of the subject disclosure.

FIG. 8 summarizes various example operations of a network device comprising a processor, including operation 802, which represents obtaining, by the network device, a serving angle corresponding to an approximate angle of a serving narrow beam of a first device of a serving cell site to a user equipment. Operation 804 represents obtaining, by the network device, first distance information from the first device of the serving cell site to the user equipment. Operation 806 represents obtaining, by the network device, second distance information from the first device of the serving cell site to a second device of a neighbor cell site, in which the neighbor cell site is a candidate for a handover of the user equipment. Operation 808 represents determining, by the network device, a handover candidate beam corresponding to a neighbor narrow beam of the second device of the neighbor cell site, based on the serving angle, the first distance information and the second distance information. Operation 810 represents sending, by the network device, a handover recommendation message that identifies the handover candidate beam to the user equipment for measurement.

Determining the handover candidate beam can comprise determining, based on the serving angle, the first distance information and the second distance information, an arrival angle that maps to the handover candidate beam.

Sending the handover recommendation message that identifies the handover candidate beam to the user equipment can comprise including identification information of the handover candidate beam in a radio resource control message. Sending the handover recommendation message can comprise including the handover candidate beam in a group of handover candidate beams identified in the handover recommendation message.

The handover candidate beam can be a first handover candidate beam; aspects can comprise selecting, by the network device, the group of handover candidate beams, comprising selecting the first handover candidate beam, and selecting a second handover candidate beam from the second device of the neighbor cell site based on historical handover information associated with the neighbor cell site.

The neighbor cell site can be a first neighbor cell site, and selecting the group of handover candidate beams can comprise selecting a third handover candidate beam from a third device of a second neighbor cell site.

Aspects can comprise receiving, by the network device from the user equipment, beam measurement data comprising respective beam measurements for respective handover candidate beams of the group of handover candidate beams.

Aspects can comprise selecting, by the network device, a narrow beam based on the beam measurement data, resulting in a selected narrow beam, and performing, by the network device, the handover of the user equipment from the serving narrow beam to the selected narrow beam.

Obtaining the first distance information from the first device of the serving cell site to the user equipment can comprise obtaining time alignment data associated with the user equipment, and determining the first distance information based on the time alignment data.

Figure 9:
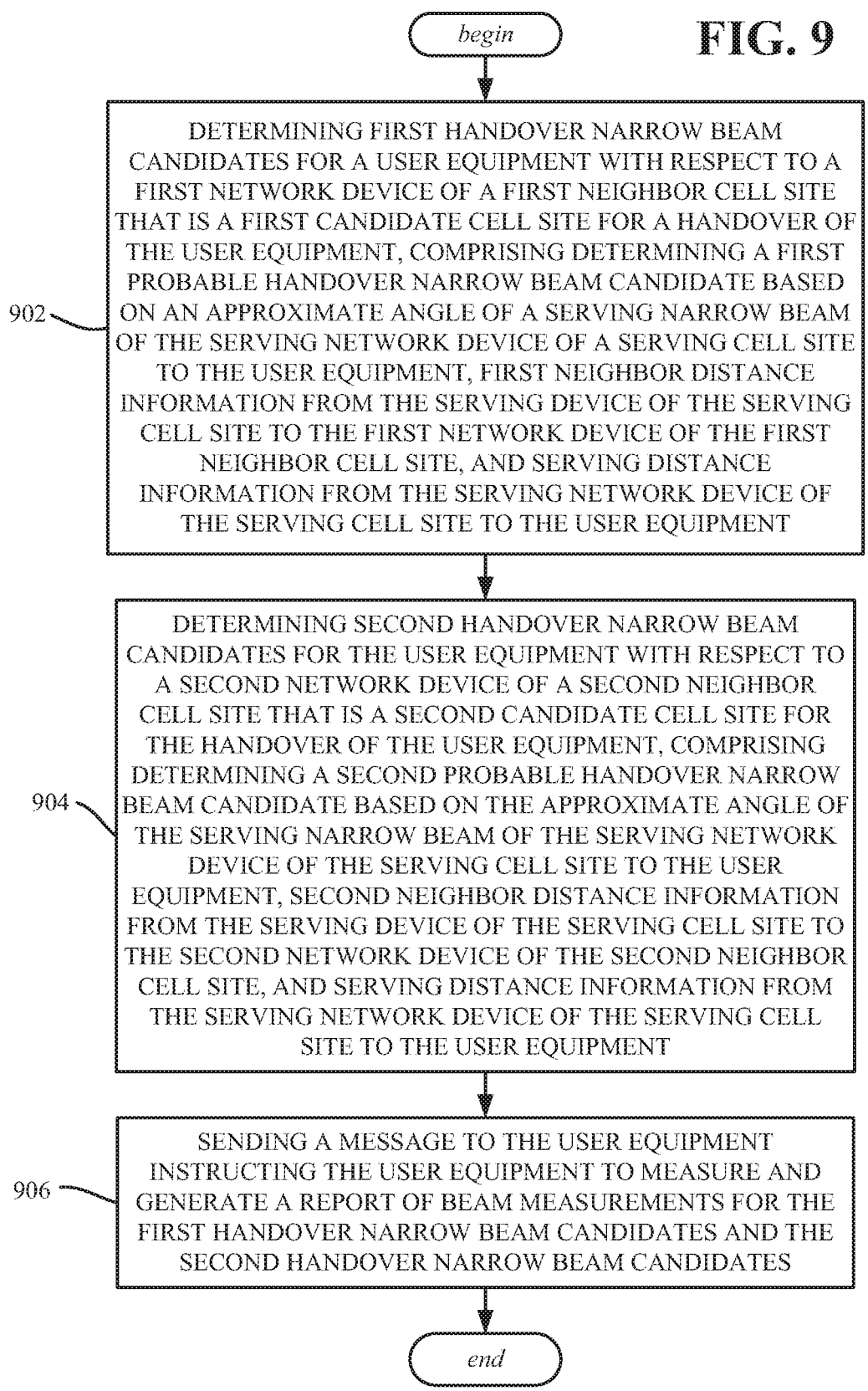
FIG. 9 illustrates a flow diagram of example operations of a network device to recommend narrow beam handover candidates of different sites to a user equipment, in accordance with various aspects and implementations of the subject disclosure.

FIG. 9 summarizes various example operations of a serving network device in a wireless network, e.g., comprising a processor and a memory that stores executable instructions that, when executed by the processor, facilitate performance of operations. Operation 902 represents determining first handover narrow beam candidates for a user equipment with respect to a first network device of a first neighbor cell site that is a first candidate cell site for a handover of the user equipment, comprising determining a first probable handover narrow beam candidate based on an approximate angle of a serving narrow beam of the serving network device of a serving cell site to the user equipment, first neighbor distance information from the serving device of the serving cell site to the first network device of the first neighbor cell site, and serving distance information from the serving network device of the serving cell site to the user equipment. Operation 904 represents determining second handover narrow beam candidates for the user equipment with respect to a second network device of a second neighbor cell site that is a second candidate cell site for the handover of the user equipment, comprising determining a second probable handover narrow beam candidate based on the approximate angle of the serving narrow beam of the serving network device of the serving cell site to the user equipment, second neighbor distance information from the serving device of the serving cell site to the second network device of the second neighbor cell site, and serving distance information from the serving network device of the serving cell site to the user equipment. Operation 906 represents sending a message to the user equipment instructing the user equipment to measure and generate a report of beam measurements for the first handover narrow beam candidates and the second handover narrow beam candidates.

Further operations can comprise receiving a report from the user equipment comprising the beam measurements, selecting a selected narrow beam for the handover of the user equipment based on the beam measurements, and performing the handover of the user equipment from the serving narrow beam to the selected narrow beam.

The message can comprise a radio resource control message. The report can be received in a radio resource control reconfiguration message.

Determining the first handover narrow beam candidates can comprise using historical handover information associated with the first network device of the first neighbor cell site.

Figure 10:
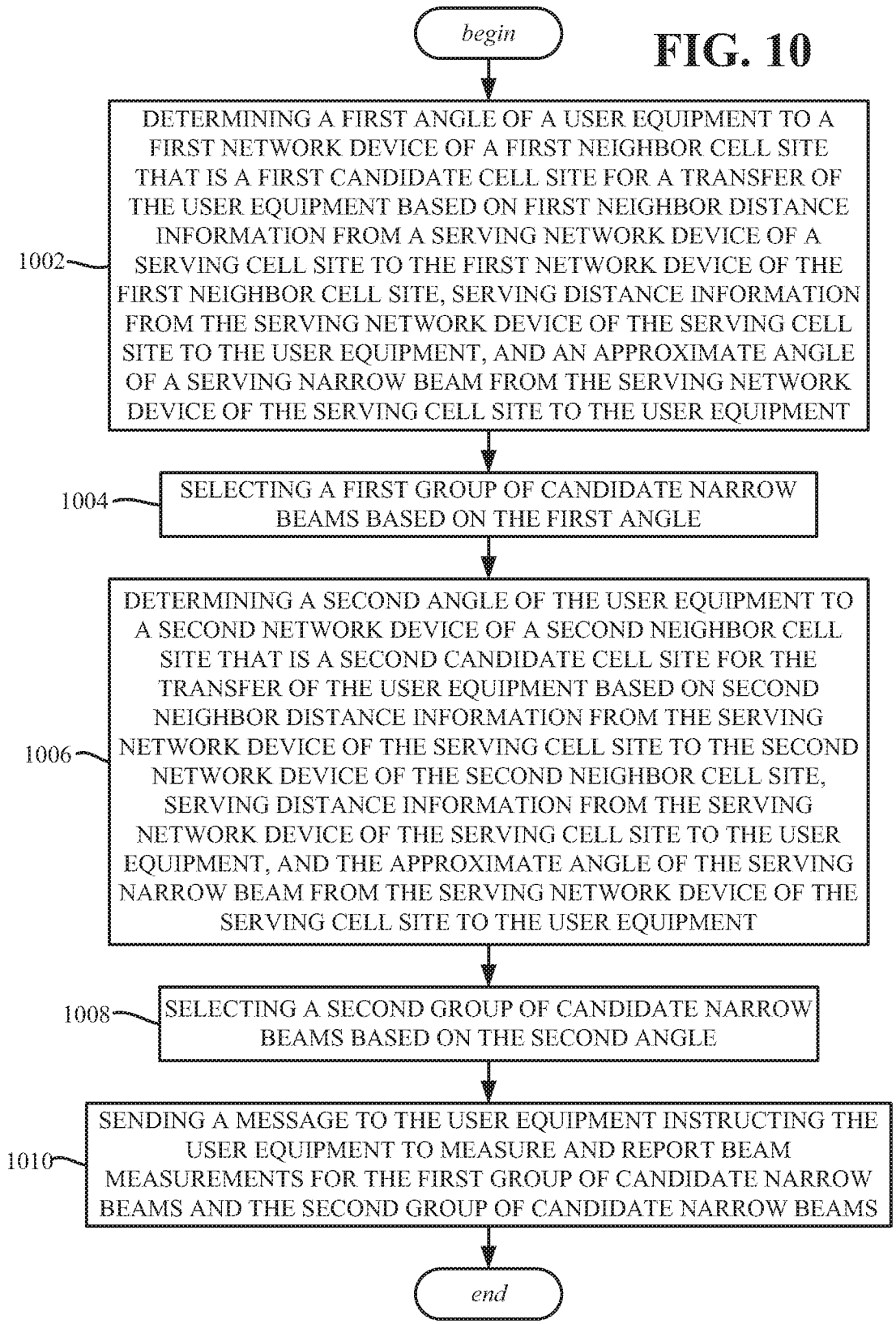
FIG. 10 illustrates a flow diagram of example operations of a network device to request measurement of recommended narrow beam handover candidates to a user equipment, in accordance with various aspects and implementations of the subject disclosure.

Other example operations are represented in FIG. 10, and which, for example, can be implemented via a machine-readable storage medium, comprising executable instructions that, when executed by a processor of a network device in a wireless network, facilitate performance of the operations. Operation 1002 represents determining a first angle of a user equipment to a first network device of a first neighbor cell site that is a first candidate cell site for a transfer of the user equipment based on first neighbor distance information from a serving network device of a serving cell site to the first network device of the first neighbor cell site, serving distance information from the serving network device of the serving cell site to the user equipment, and an approximate angle of a serving narrow beam from the serving network device of the serving cell site to the user equipment. Operation 1004 represents selecting a first group of candidate narrow beams based on the first angle. Operation 1006 represents determining a second angle of the user equipment to a second network device of a second neighbor cell site that is a second candidate cell site for the transfer of the user equipment based on second neighbor distance information from the serving network device of the serving cell site to the second network device of the second neighbor cell site, serving distance information from the serving network device of the serving cell site to the user equipment, and the approximate angle of the serving narrow beam from the serving network device of the serving cell site to the user equipment. Operation 1008 represents selecting a second group of candidate narrow beams based on the second angle. Operation 1010 represents sending a message to the user equipment instructing the user equipment to measure and report beam measurements for the first group of candidate narrow beams and the second group of candidate narrow beams.

Further operations can comprise receiving a report from the user equipment comprising the beam measurements for the first group of candidate narrow beams and the second group of candidate narrow beams, selecting a narrow beam for the transfer of the user equipment based on the beam measurements, resulting in a selected narrow beam, and performing the transfer of the user equipment based on the selected narrow beam.

Sending the message to the user equipment instructing the user equipment to measure and report beam measurements can comprise sending a radio resource control message to the user equipment, and wherein the receiving the report from the user equipment comprises receiving a radio resource control reconfiguration message from the user equipment.

Selecting the first group of candidate narrow beams based on the first angle can comprise selecting a first candidate narrow beam that maps to the first angle for the first group, and selecting a second candidate narrow beam based on the first candidate narrow beam for the first group. Selecting the second candidate narrow beam based on the first candidate narrow beam can comprise using historical transfer-related information associated with the first network device of the first neighbor cell site. Selecting the second candidate narrow beam based on the first candidate narrow beam can comprise applying machine learning based on transfer-related information associated with the second candidate narrow beam.

As can be seen, the technology described herein thus facilitates handover of a user equipment to a narrow beam of a neighbor cell site. The technology thus results in significant antenna gain (on the order of +12 dB), whereby it is less likely that a user equipment will lose new radio communication between cell sites without needing to deploy many more cell sites.

Figure 11:
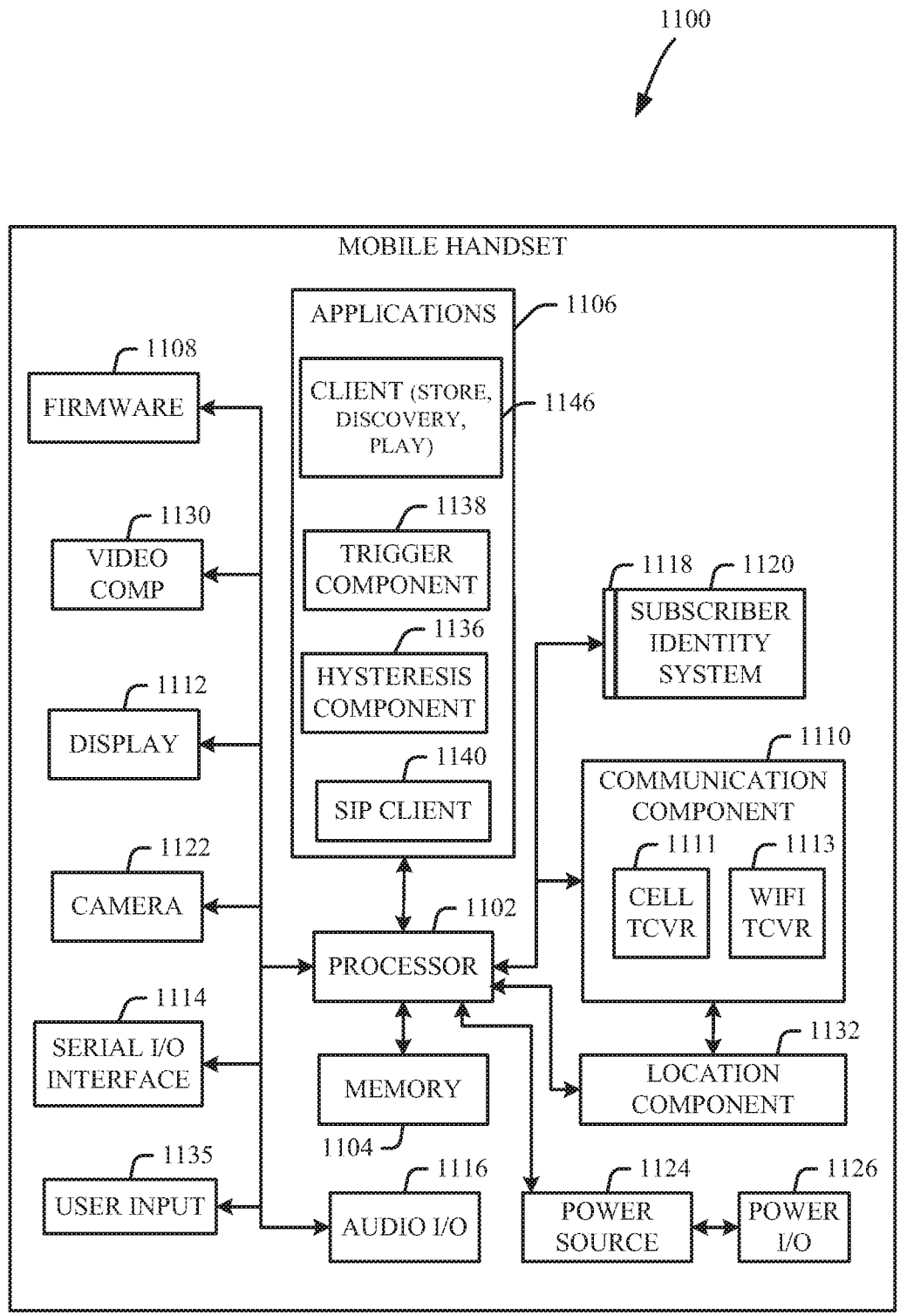
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 1002.11, for the dual-mode GSM handset 1100. The handset 1100 can accommodate at least satellite radio services through a handset that can combine wireless voice and digital radio chipsets into a single handheld device.

Figure 12:
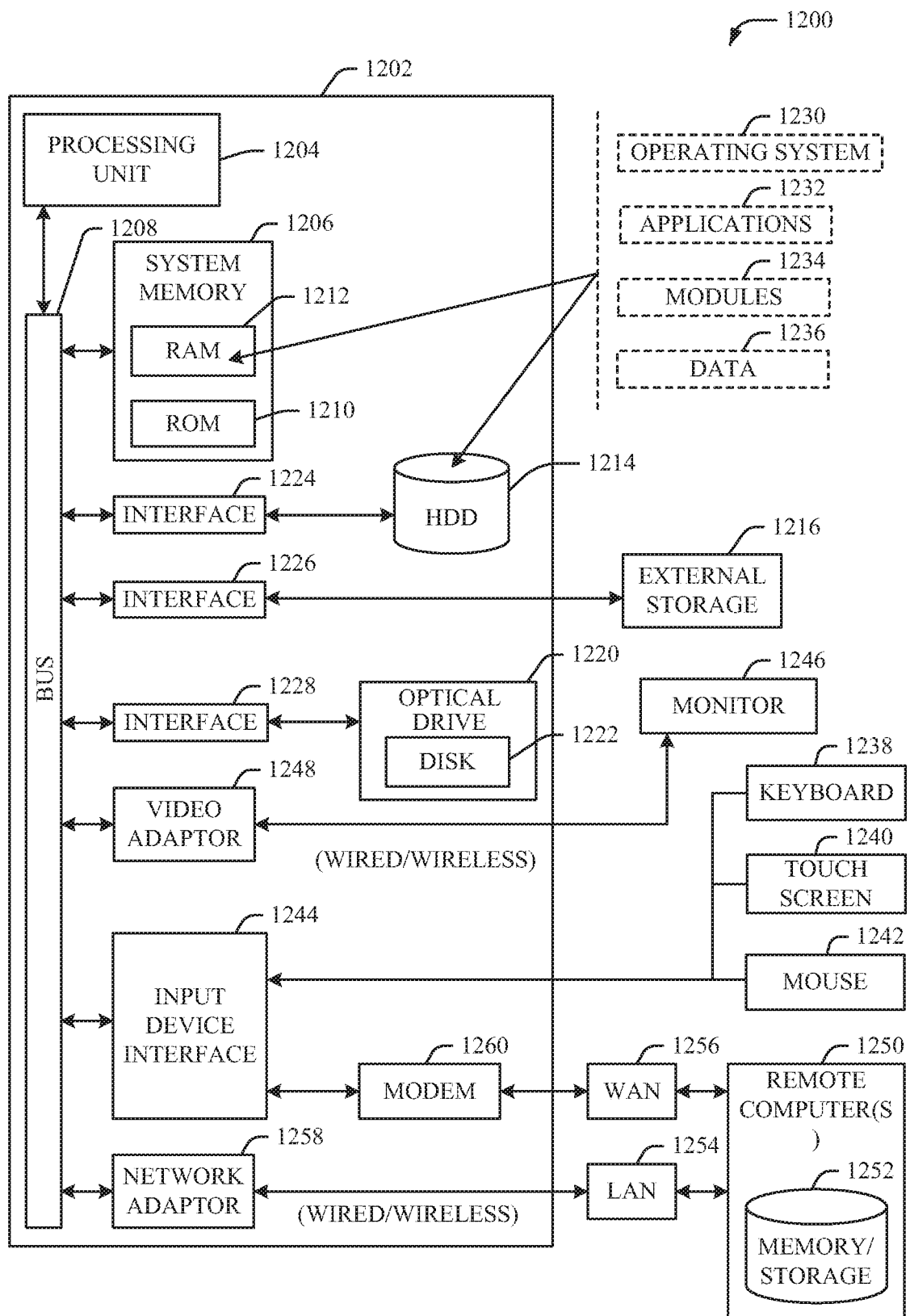
FIG. 12 illustrates an example block diagram of an example computer operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the technology can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from media 1222 such as a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
    obtaining, by network equipment comprising a processor, a serving angle corresponding to an approximate angle of a serving narrow beam of first equipment of a serving cell site to a user equipment;

obtaining, by the network equipment, first distance information from the first equipment of the serving cell site to the user equipment;

obtaining, by the network equipment, second distance information from the first equipment of the serving cell site to second equipment of a neighbor cell site, in which the neighbor cell site is a candidate for a handover of the user equipment;

determining, by the network equipment, a handover candidate beam corresponding to a neighbor narrow beam of the second equipment of the neighbor cell site, based on the serving angle, the first distance information, the second equipment information, and historical handover data associated with the handover candidate beam; and sending, by the network equipment, a handover recommendation message that identifies the handover candidate beam to the user equipment, wherein the handover candidate beam is a neighbor beam adjacent to the serving narrow beam, and wherein utilizing the handover candidate beam decreases a neighbor measurement.

2. The method of claim 1, wherein determining the handover candidate beam comprises determining, based on the serving angle, the first distance information and the second distance information, an arrival angle that maps to the handover candidate beam.

3. The method of claim 1, wherein sending the handover recommendation message that identifies the handover candidate beam to the user equipment comprises including identification information of the handover candidate beam in a radio resource control message.

4. The method of claim 1, wherein sending the handover recommendation message comprises including the handover candidate beam in a group of handover candidate beams identified in the handover recommendation message.

5. The method of claim 4, wherein the handover candidate beam is a first handover candidate beam, and further comprising selecting, by the network equipment, the group of handover candidate beams, comprising selecting the first handover candidate beam, and selecting a second handover candidate beam from the second equipment of the neighbor cell site based on historical handover information associated with the neighbor cell site.

6. The method of claim 5, wherein the neighbor cell site is a first neighbor cell site, and wherein selecting the group of handover candidate beams comprises selecting a third handover candidate beam from a third equipment of a second neighbor cell site.

7. The method of claim 4, further comprising receiving, by the network equipment from the user equipment, beam measurement data comprising respective beam measurements for respective handover candidate beams of the group of handover candidate beams.

8. The method of claim 7, further comprising selecting, by the network equipment, a narrow beam based on the beam measurement data, resulting in a selected narrow beam, and performing, by the network equipment, the handover of the user equipment from the serving narrow beam to the selected narrow beam.

9. The method of claim 1, wherein obtaining the first distance information from the first equipment of the serving cell site to the user equipment comprises obtaining time alignment data associated with the user equipment, and determining the first distance information based on the time alignment data.

10. Network equipment, comprising:
a processor; and a memory that stores executable instructions that, when executed by the processor, facilitate performance of operations, the operations comprising:

based at least in part on historical handover data, determining first handover narrow beam candidates for a user equipment with respect to first network equipment of a first neighbor cell site that is a first candidate cell site for a handover of the user equipment, comprising determining a first probable handover narrow beam candidate based on an approximate angle of a serving narrow beam of the network equipment of a serving cell site to the user equipment, first neighbor distance information from the network equipment of the serving cell site to the first network equipment of the first neighbor cell site, and serving distance information from the network equipment of the serving cell site to the user equipment;

based at least in part on the historical handover data, determining second handover narrow beam candidates for the user equipment with respect to second network equipment of a second neighbor cell site that is a second candidate cell site for the handover of the user equipment, comprising determining a second probable handover narrow beam candidate based on the approximate angle of the serving narrow beam of the network equipment of the serving cell site to the user equipment, second neighbor distance information from the serving equipment of the serving cell site to the second network equipment of the second neighbor cell site, and serving distance information from the network equipment device of the serving cell site to the user equipment; and sending a message to the user equipment instructing the user equipment to measure and generate a report of beam measurements for the first handover narrow beam candidates and the second handover narrow beam candidates, wherein the first handover narrow beam candidates and the second handover narrow beam candidates are neighbor handover narrow beam candidates that are adjacent to the serving narrow beam, and wherein utilizing the first handover narrow beam candidates and the second handover narrow beam candidates results in a decrease in neighbor measurement.

11. The network equipment of claim 10, wherein the operations further comprise:

receiving a report from the user equipment comprising the beam measurements, selecting a narrow beam for the handover of the user equipment based on the beam measurements, resulting in a selected narrow beam, and performing the handover of the user equipment from the serving narrow beam to the selected narrow beam.

12. The network equipment of claim 10, wherein the message comprises a radio resource control message.

13. The network equipment of claim 10, wherein the report is received in a radio resource control reconfiguration message.

14. The network equipment of claim 10, wherein determining the first handover narrow beam candidates comprises using historical handover information associated with the first network device of the first neighbor cell site.

15. A non-transitory machine-readable medium, comprising executable instructions that, when executed by a processor of a serving network equipment of a serving cell site, facilitate performance of operations, the operations comprising:

determining a first angle of a user equipment to first network equipment of a first neighbor cell site that is a first candidate cell site for a transfer of the user equipment based on first neighbor distance information from the serving network equipment to the first network equipment of the first neighbor cell site, serving distance information from the serving network equipment to the user equipment, and an approximate angle of a serving narrow beam from the serving network equipment to the user equipment;

selecting a first group of candidate narrow beams based on the first angle and historical handover data associated with a previous narrow beam handover;

determining a second angle of the user equipment to second network equipment of a second neighbor cell site that is a second candidate cell site for the transfer of the user equipment based on second neighbor distance information from the serving network equipment to the second network equipment of the second neighbor cell site, serving distance information from the serving network equipment to the user equipment, and the approximate angle of the serving narrow beam from the serving network equipment to the user equipment;

selecting a second group of candidate narrow beams based on the second angle and historical handover data associated with the previous narrow beam handover; and sending a message to the user equipment instructing the user equipment to measure and report beam measurements for the first group of candidate narrow beams and the second group of candidate narrow beams, wherein the first group of candidate narrow beams and the second group of candidate narrow beams are adjacent to the serving narrow beam, and wherein utilizing the first group of candidate narrow beams and the second group of candidate narrow beams decreases a neighbor measurement.

16. The non-transitory machine-readable medium of claim 15, wherein the operations further comprise receiving a report from the user equipment comprising the beam measurements for the first group of candidate narrow beams and the second group of candidate narrow beams, selecting a narrow beam for the transfer of the user equipment based on the beam measurements, resulting in a selected narrow beam, and performing the transfer of the user equipment based on the selected narrow beam.

17. The non-transitory machine-readable medium of claim 16, wherein sending the message to the user equipment instructing the user equipment to measure and report the beam measurements comprises sending a radio resource control message to the user equipment, and wherein receiving the report from the user equipment comprises receiving a radio resource control reconfiguration message from the user equipment.

18. The non-transitory machine-readable medium of claim 15, wherein selecting the first group of candidate narrow beams based on the first angle comprises selecting a first candidate narrow beam that maps to the first angle for the first group, and selecting a second candidate narrow beam based on the first candidate narrow beam for the first group.

19. The non-transitory machine-readable medium of claim 18, wherein selecting the second candidate narrow beam based on the first candidate narrow beam comprises using historical transfer-related information associated with the first network device of the first neighbor cell site.

20. The non-transitory machine-readable medium of claim 19, wherein selecting the second candidate narrow beam based on the first candidate narrow beam comprises using a model generated from machine learning based on transfer-related information associated with the second candidate narrow beam.

* * * * *